(12) United States Patent
Biesiadecki

(10) Patent No.: US 9,920,528 B1
(45) Date of Patent: Mar. 20, 2018

(54) BUILDING PANEL STRUCTURE

(71) Applicant: John Biesiadecki, Sycamore, IL (US)

(72) Inventor: John Biesiadecki, Sycamore, IL (US)

( * ) Notice: Subject to any disclaimer, the term of this patent is extended or adjusted under 35 U.S.C. 154(b) by 0 days.

(21) Appl. No.: 15/832,637

(22) Filed: Dec. 5, 2017

Related U.S. Application Data

(62) Division of application No. 15/485,520, filed on Apr. 12, 2017.

(51) Int. Cl.
*E04C 2/284* (2006.01)
*B32B 3/08* (2006.01)
(Continued)

(52) U.S. Cl.
CPC ............ *E04C 2/284* (2013.01); *B28B 1/16* (2013.01); *B28B 11/245* (2013.01); *B29C 67/246* (2013.01); *B32B 3/08* (2013.01); *B32B 3/28* (2013.01); *B32B 7/08* (2013.01); *B32B 13/12* (2013.01); *B32B 15/095* (2013.01); *B32B 15/18* (2013.01); *B32B 27/40* (2013.01); *E04B 1/14* (2013.01); *E04B 1/762* (2013.01); *E04B 1/7608* (2013.01); *B29K 2075/00* (2013.01); *B29K 2705/00* (2013.01); *B29K 2709/06* (2013.01); *B29K 2995/0015* (2013.01);
(Continued)

(58) Field of Classification Search
CPC ...... E04C 2/284; E04B 1/17608; E04B 1/762; E04B 1/14; E04B 2002/0202; B32B 15/095; B32B 27/40; B32B 13/12; B32B 15/18; B32B 7/08; B32B 3/08; B32B 3/28; B32B 2607/00; B32B 2250/03; B28B 11/245; B28B 1/16; B29C 67/246; B29L 2031/776; B29K 2705/00; B29K 2709/06; B29K 2075/00; B29K 2995/0015
See application file for complete search history.

(56) References Cited

U.S. PATENT DOCUMENTS 3,295,278 A * 1/1967 Muhm ..................... E04C 2/044
264/256
3,884,009 A * 5/1975 Frohlich .................. E04D 11/02
52/302.1
(Continued)

FOREIGN PATENT DOCUMENTS

GB 2055326 A * 3/1981 ............. B32B 27/08

*Primary Examiner* — Rodney Mintz
(74) *Attorney, Agent, or Firm* — Steven H Greenfield; Greenfield Invention and Patent Consulting, Inc.

(57) ABSTRACT

A building panel structure and a process for manufacturing the structure are disclosed. The structure comprises a concrete layer disposed on the outside of a building, an insulating material comprising polyurethane in the center of the structure and a corrugated steel layer on the inside of the building. A steel plate overlays the top of the panel and a lip member attached to the plate and perpendicular to it covers a portion of the corrugated steel layer exposed surface. U-shaped loops are welded to the plate and embedded in the concrete to provide structural integrity and shear resistance to the structure. The process of manufacturing the building structure comprises positioning the plate, lip and loop assembly in a container, setting the concrete on the bottom of the container over the loops and forming the polyurethane layer between the concrete and corrugated steel layers by an in-situ chemical reaction.

7 Claims, 7 Drawing Sheets

(51) Int. Cl.
*B29C 67/24* (2006.01)
*B28B 11/24* (2006.01)
*B28B 1/16* (2006.01)
*B32B 27/40* (2006.01)
*B32B 13/12* (2006.01)
*B32B 15/18* (2006.01)
*B32B 15/095* (2006.01)
*B32B 7/08* (2006.01)
*B32B 3/28* (2006.01)
*E04B 1/76* (2006.01)
*E04B 1/14* (2006.01)
*B29L 31/00* (2006.01)
*B29K 705/00* (2006.01)
*B29K 709/06* (2006.01)
*B29K 75/00* (2006.01)
*E04B 2/02* (2006.01)

(52) U.S. Cl.
CPC ..... *B29L 2031/776* (2013.01); *B32B 2250/03* (2013.01); *B32B 2607/00* (2013.01); *E04B 2002/0202* (2013.01)

(56) References Cited

U.S. PATENT DOCUMENTS

| | | | | |
|---|---|---|---|---|
| 4,189,886 A | * | 2/1980 | Frohlich | E04D 7/00 52/302.1 |
| 5,787,668 A | * | 8/1998 | Carkner | E04D 11/02 52/302.1 |
| 5,809,723 A | * | 9/1998 | Keith | E04C 2/288 411/475 |
| 6,167,624 B1 | * | 1/2001 | Lanahan | B26D 1/553 264/142 |
| 6,176,920 B1 | * | 1/2001 | Murphy | B28B 1/093 106/711 |
| 6,584,749 B2 | * | 7/2003 | Sperber | E04B 1/7604 52/404.1 |
| 7,543,419 B2 | * | 6/2009 | Rue | E04C 2/22 52/309.16 |
| 8,555,584 B2 | * | 10/2013 | Ciuperca | E04B 1/355 52/309.12 |
| 9,151,053 B2 | * | 10/2015 | Stephens, Jr. | E04C 2/52 |
| 9,279,075 B2 | * | 3/2016 | Parker | C04B 28/10 |
| 9,303,404 B2 | * | 4/2016 | Naito | E04C 2/46 |
| 9,725,902 B1 | * | 8/2017 | Chugh | E04C 2/284 |
| 2002/0112442 A1 | * | 8/2002 | Sperber | E04B 1/7604 52/742.1 |
| 2011/0008624 A1 | * | 1/2011 | Roseeuw | A47B 96/206 428/411.1 |
| 2012/0216476 A1 | * | 8/2012 | Naidoo | E04B 1/14 52/309.4 |
| 2013/0034732 A1 | * | 2/2013 | Parker | C04B 28/10 428/402 |
| 2013/0067838 A1 | * | 3/2013 | Black | E04C 2/22 52/220.7 |
| 2013/0133277 A1 | * | 5/2013 | Lewis | E04B 1/7675 52/220.1 |
| 2014/0033627 A1 | * | 2/2014 | Stephens, Jr. | E04C 2/52 52/204.5 |

* cited by examiner

BUILDING PANEL STRUCTURE

RELATED APPLICATIONS

This application is a divisional patent application that claims priority from non-provisional application Ser. No. 15/485,520 filed on Apr. 12, 2017.

FIELD OF THE INVENTION

The present invention relates to a prefabricated building panel that provides high insulation value and rigidity. The building panel of the present invention may be made in a wide range of sizes and is configured for positioning and transportation on flatbed trucks. The building panel is suitable for any size building including commercial, institutional, residential and industrial.

BACKGROUND OF THE INVENTION

Current art building panels are typically manufactured in three layers: a concrete layer that faces to the outside of the building, a concrete layer that faces to the inside of the building and an insulation layer in between. Typical insulating materials that are used in these panels include polyisocyanurate or polystyrene loosely sandwiched between the two concrete layers. Typical insulation (R) values for this type of a panel range between about R4 to R8.

The structures made of two layers of concrete and loose foam insulation generally have high compression strength, but lack tensile and shear strength. This makes the panels susceptible to delamination from shearing forces such as due to high winds. Concrete also has a tendency to crack or shatter from the impact of blunt force.

Heating or cooling losses resulting from the use of low insulation values of typical panels used in all buildings can be significant. It would be, therefore, be desirable to use building panels in all construction that have high insulation value in the range of about R30-R40 and even higher, yet have high compressive strength, tensile strength, shearing strength and bending rigidity to withstand high winds, withstand the high vertical loads exerted by roofs and floors, and maintain integrity while being hoisted, loaded onto trucks and transported.

SUMMARY OF THE PRESENT INVENTION

In one aspect of the present invention, a layered panel comprises: a first layer having a first surface disposed at the front side of the panel and a second opposing surface being disposed on an inside of the panel, the first layer also comprising a top surface; a second layer having a first surface in contact with the second surface of the first layer and a second opposing surface being disposed on an inside of the panel, the second layer also comprising a top surface; a third layer having a first surface disposed at the rear side of the panel, a second opposing surface being disposed on an inside of the panel, the second surface of the third later being in contact with the second opposing surface of the second layer, the third layer also comprising a top surface; and a plate overlaying the top surface of the first layer, the top surface of the second layer and the top surface of the third layer, the plate comprising a top surface and a bottom surface.

In another aspect of the present invention, a process for manufacturing a structure containing a first layer having a first surface disposed at the front side of the panel and a second opposing surface being disposed on an inside of the panel, the first layer also comprising a top surface; a second layer having a first surface in contact with the second surface of the first layer and a second opposing surface being disposed on an inside of the panel, the second layer also comprising a top surface; a third layer having a first surface disposed at the rear side of the panel, a second opposing surface being disposed on an inside of the panel, the second surface of the third later being in contact with the second opposing surface of the second layer, the third layer also comprising a top surface; and a plate overlaying the top surface of the first layer, the top surface of the second layer and the top surface of the third layer, the plate comprising a top surface and a bottom surface, wherein the plate overlaying the top surface comprises a lip member, the lip member being substantially perpendicular to the plate, the lip member overlaying a portion of the first surface of the third layer; and a plurality of loops, each loop being embedded inside the first layer, and each loop containing two peaks attached to the bottom surface of the plate, the method comprises: providing an open-top container having a bottom and side walls; providing a plate assembly comprising the plate for overlaying the top surface of the first layer, the lip member substantially perpendicular to the plate being attached to the plate and the loops, each having two peaks attached to a bottom surface of the plate; placing the plate assembly inside the container such that the plate is disposed against a side wall of the container, and the lip and loops are substantially parallel with the bottom; placing the third layer in suspension in such a manner as the first surface of the third layer is in contact with a bottom surface of the lip member; placing the first layer inside the container in such a manner that the first surface of the first layer is disposed onto the bottom of the container and the second opposing surface of the first layer is disposed above the first surface; and placing the second layer between the first layer and the third layer in a manner such that the first surface of the second layer is disposed onto the second surface of the first layer and the second surface of the second layer is in contact with the second surface of the third layer.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

It is the object of the present invention to provide for a composite panel structure generally used in construction that has a high R value, high compression strength, high tensile strength and high bending stiffness.

Figure 6:
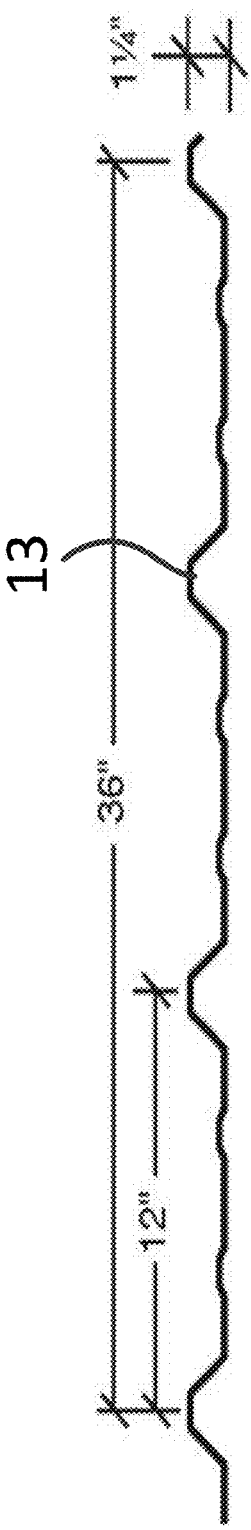
FIG. 6 is a top view of a component of the building panel according to a first and second embodiment of the present invention.
Figure 7:
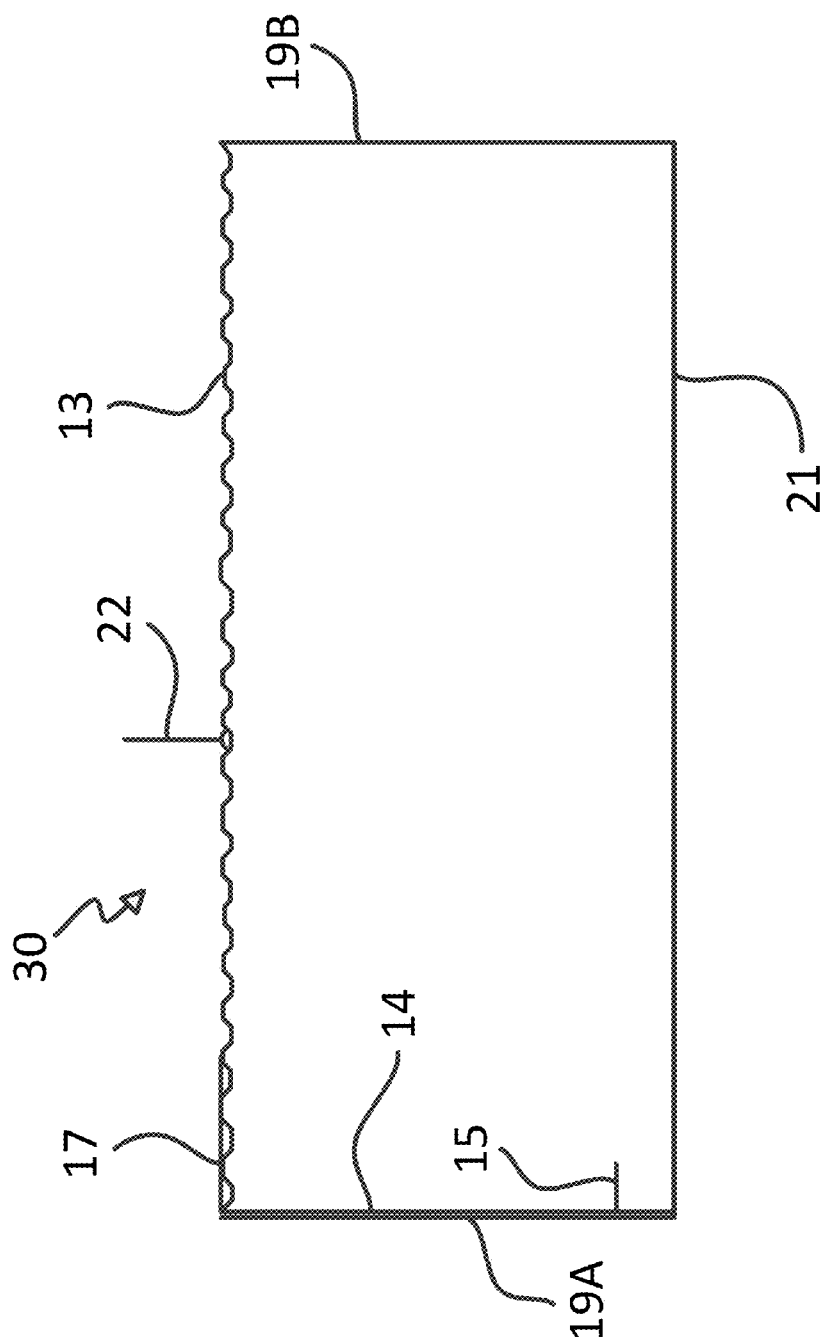
FIG. 7 is an illustration of the manufacturing process setup for the building panel showing a cross sectional view of the container where the panel is manufactured and positioning of the components.
Figure 8:
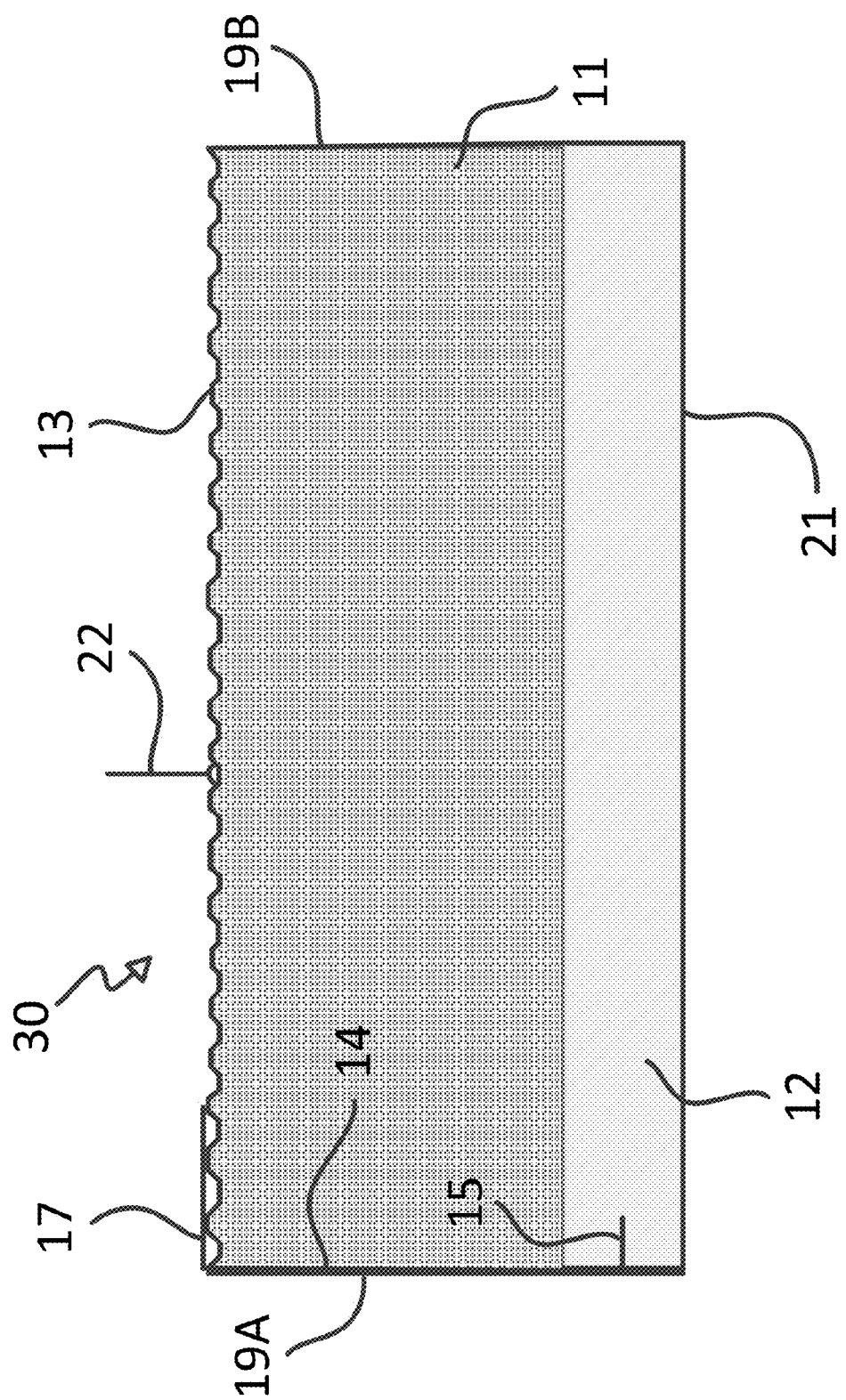
FIG. 8 is a depiction of the manufactured building panel at the completion of the process in the container.

FIGS. 1-6 describe two embodiments of the present invention. The first embodiment 10 is depicted in FIGS. 1, 3A and 4-6. The second embodiment 20 is described in FIGS. 2, 3B and 4-6. The process steps for manufacturing the building structure are illustrated in FIGS. 7 and 8.

Figure 1:
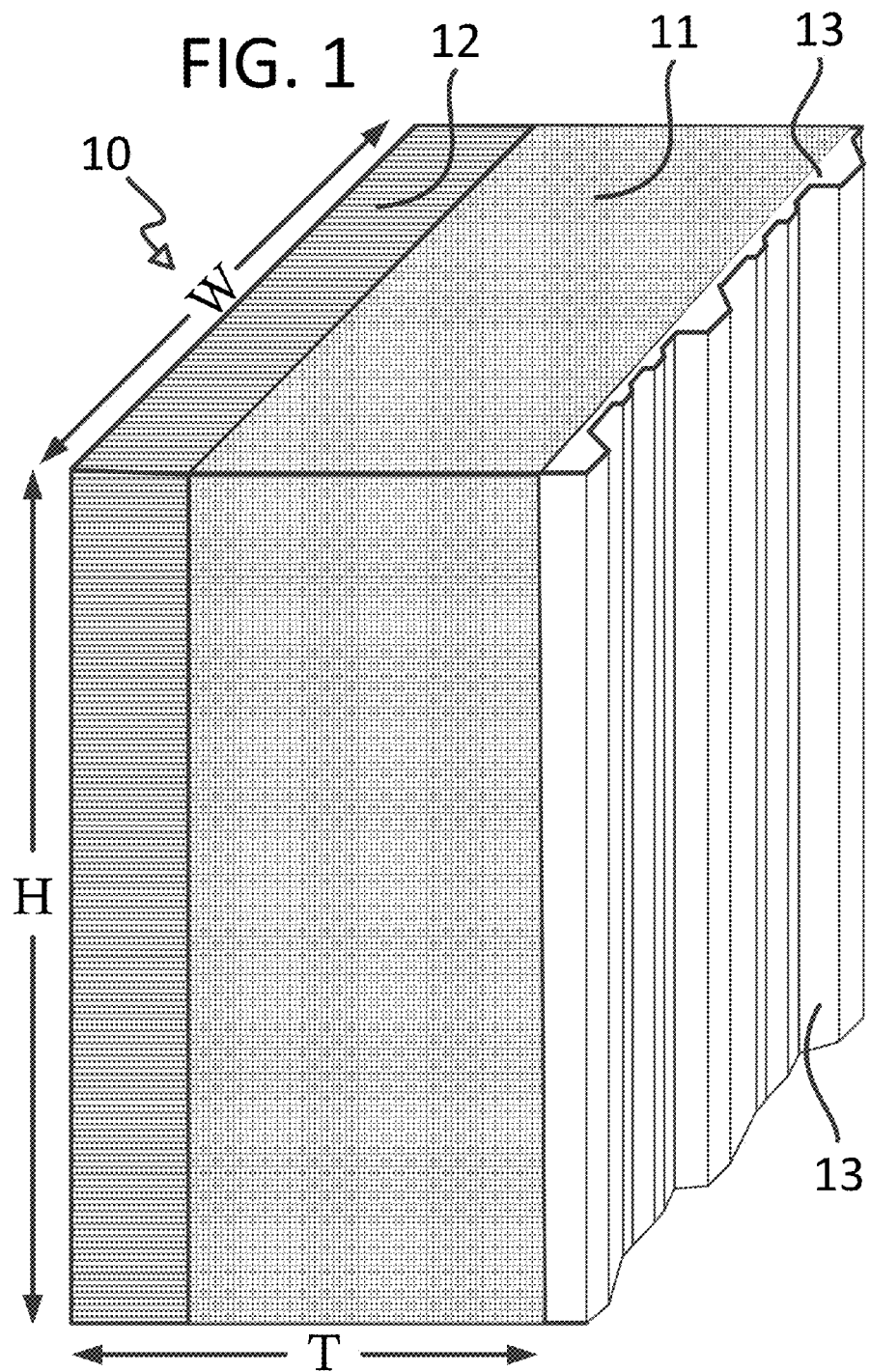
FIG. 1 shows a perspective side view of a building panel according to a first embodiment of the present invention.
Figure 2:
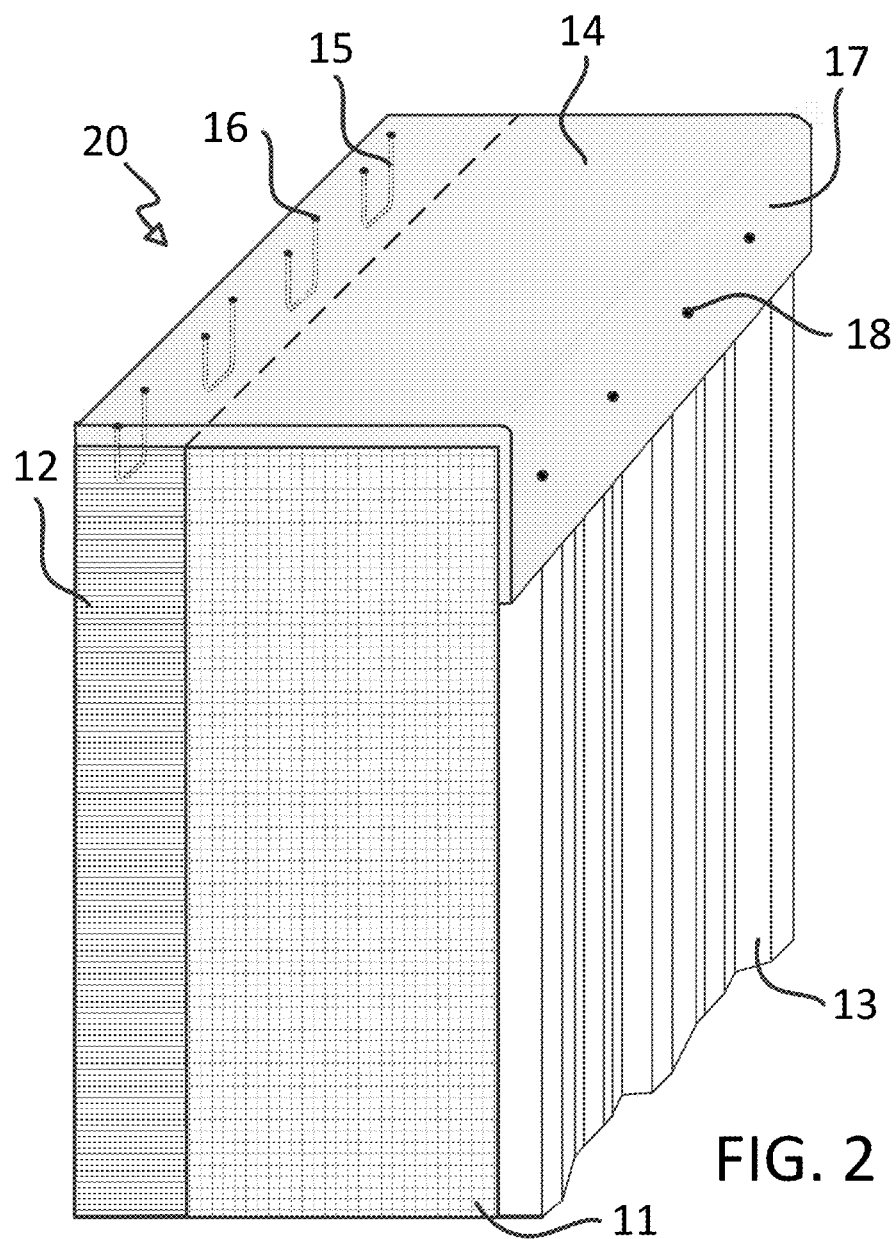
FIG. 2 is a perspective side view of a building panel according to a second embodiment of the present invention.
Figures 3A, 3B:
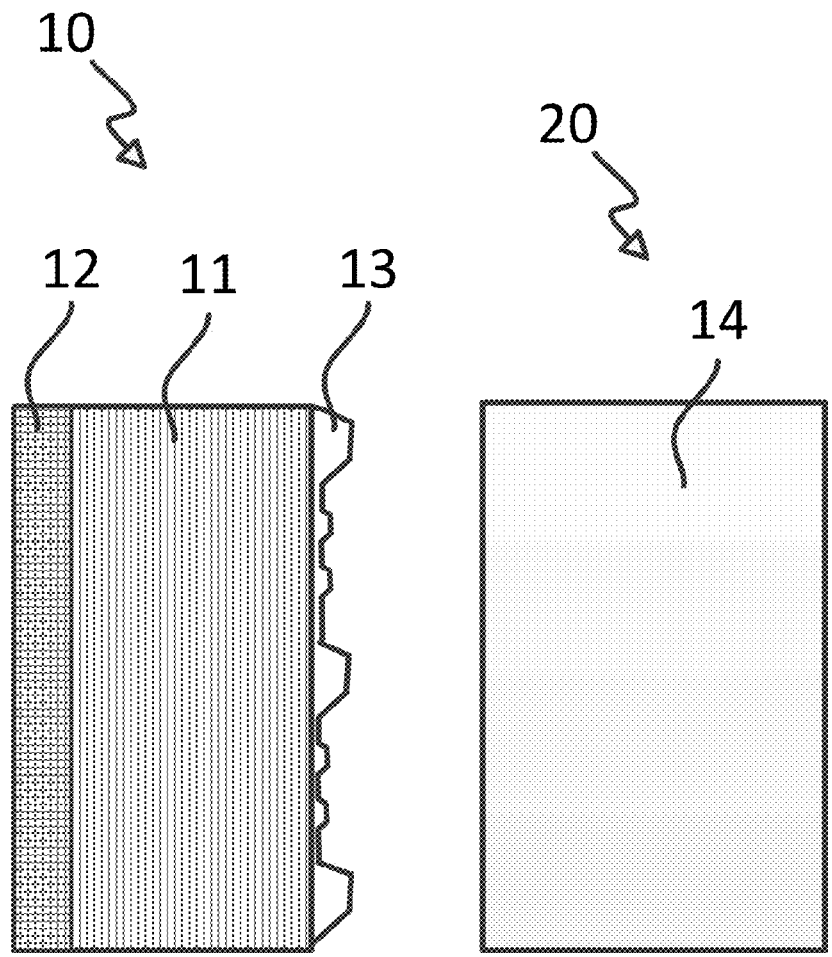
FIG. 3A is a top view of a building panel according to a first embodiment of the present invention.
FIG. 3B is a top view of a building panel according to a second embodiment of the present invention.
Figure 4:
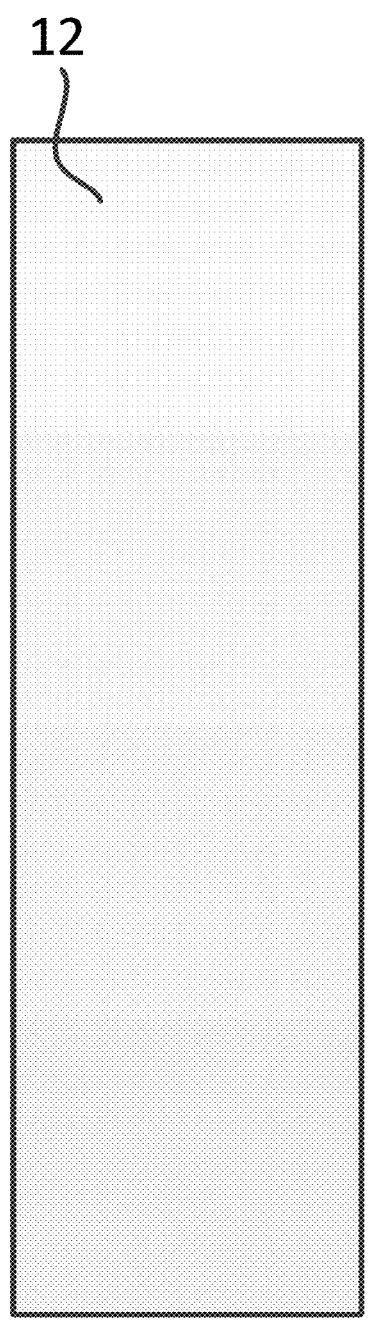
FIG. 4 represents a front and rear view of a building panel according to a first and second embodiment of the present invention.
Figure 5:
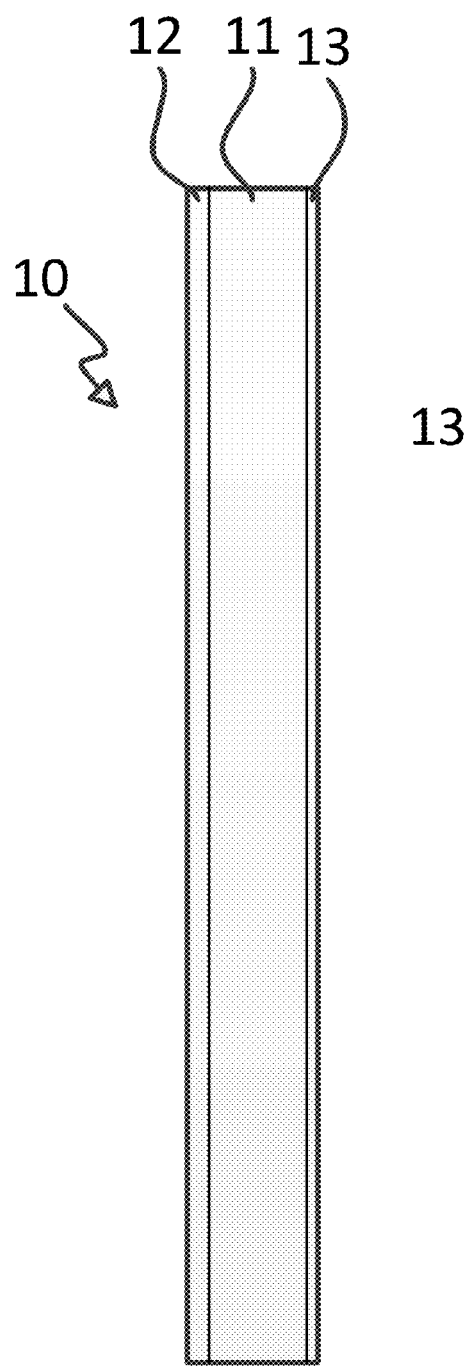
FIG. 5 depicts a side view of a building panel according to a first and second embodiment of the present invention.

In FIG. 1, the composite panel 10 contains a layer made of concrete 12, an insulation layer 11, and a corrugated layer 13.

The concrete is made of a specific formulation that maximizes the compression strength of the structures. The composition may contain silicon oxide, aluminum oxide, iron oxide, calcium oxide, magnesium oxide and sulfur trioxide in varying proportions. However, other component materials for the concrete also fall within the scope of the present invention.

The insulating material is, preferably, polyurethane; however, other insulating materials also fall within the scope of the present invention.

The corrugated sheet layer 13 is preferably made of steel. A range of different thicknesses is suitable for the corrugated sheet. An exemplary corrugated panel configuration and dimensions are shown in FIG. 6; however, other panel configurations and dimensions also fall within the scope of the present invention.

The panel composite is manufactured in a way that the polyurethane layer strongly adheres to the concrete layer on one side and to the corrugated layer on the other side. The structure of this panel solves the problem of building a high R value into the panel while also providing structural integrity to the panel such as resistance to shearing and budding as a result of the impact of high winds or other lateral forces.

The second embodiment structure of the present invention 20 further enhances the ability of the panel to withstand high vertical loads that could be exerted by a heavy roof, floor, snow piles and high winds. A plate 14 is placed on top of and fully covers the panel composite 20. A lip 17 that is substantially perpendicular to the plate is placed against the corrugated panel 13. A plurality of U-shaped loops 15 are attached to the bottom side of the plate 14 at their peak points 16. The preferred attachment is accomplished by welding; however, other attachment means also fall within the scope of the present invention. The lip 17 may be a perpendicular extension of the plate 14 or be attached to the plate 14 such as by welding or other means of attachment.

The U-shaped loops 15 are embedded into the concrete layer 12. The top plate assembly 14 containing the lip 17 and the embedded U-shaped loops 15 reinforces the panel composite to withstand high vertical loads. The plate assembly 14 is preferably made of steel; however, other materials such as metallic alloys, plastic and wood also fall within the scope of the present invention. Self-tapping screws 18 are used to fasten the lip 17 of the plate assembly to the corrugated layer in order to further reinforce the structure. The preferred material of construction for the U-shaped loops is steel; however, other materials also fall within the scope of the present invention.

Exemplary dimensions for the panel composite and its components are as follows:

The height (H) of the composite panel depends on the building specifications and may range from 1' to 50'.

The thickness of the concrete layer: 2" and ranging from 2" to 6".

The thickness of the insulation layer: 4.75" with a range of 2" to 10"

The highest thickness of the corrugated steel: gauge 26 to 2×gauge 22.

The thickness of the composite panel (T): 8" with a range of between 5.5" and 18".

The width (W) of the panel is 6' with a range of 6' to 12'.

The manufacturing process for the first embodiment of the composite panel is as follows:

1. The concrete is poured into the bottom of an open top enclosure sufficiently large to contain the full panel.

2. After the concrete is set, the corrugated layer is suspended above the enclosure by hoist in a way as to allow for the proper space between the concrete and the corrugated layer.

3. A heavy lid is placed onto the enclosure to contain the pressure that would result from the reaction to form the polyurethane insulation layer.

4. The liquid ingredients that react to produce the solid polyurethane layer are injected into the enclosure. The reaction is typically accomplished by mixing a diisocyanate with a polyol at about 80° F. The reaction takes place in the space between the concrete and corrugated sheet.

5. Once fully formed, the solid polyurethane bonds to both the concrete and corrugated layers.

The manufacturing process for the second embodiment of the composite panel is as follows:

1. The plate assembly containing the U-shaped loops attached to the bottom of the plate is placed at one end in an open top enclosure sufficiently large to contain the full panel.

2. The concrete is then poured into the bottom of the open top enclosure over the U-shaped loops and allowed to set in such a way that the U-shaped loops become embedded inside the concrete.

3. The corrugated layer is suspended by a hoist such that the end of the top portion of the corrugated layer is placed under the vertical portion of the plate assembly.

4. A heavy lid is placed onto the enclosure to contain the pressure that would result from the reaction to form the polyurethane insulation layer.

5. The reactants needed to form the polyurethane layer are injected into the space between the concrete and corrugated layer and are reacted. This forms a solid polyurethane layer wedged between the concrete and corrugated layer such that the solid polyurethane is bonded to both the concrete and corrugated layers.

6. The lid is then removed and self-tapping screws are inserted through the vertical portion of the plate assembly and into the materials below.

The manufacturing process for the second embodiment of the composite panel is illustrated in FIGS. 7 and 8. The setup for manufacturing 30 the building panel includes an open top container with side walls 19A and 19B and bottom 21. The corrugated metal layer referred to as the third layer 13, is suspended using support cable 22. The corrugated metal layer 13 is placed under the lip 17 that is attached to the plate 14. The plate 14 is disposed against interior side wall 19A of the container as shown in FIG. 7. The concrete 12 is then poured onto the bottom of the container 21 such that the u-shaped loops become embedded inside the concrete as shown in FIG. 8. The concrete layer 12 is allowed to cure and harden. The polyurethane fills the gap between the concrete layer 12 and the corrugated layer 13 and when the reaction to produce the polyurethane is complete, a solid polyurethane layer is formed. The polyurethane layer has good adhesion properties and adheres well to the concrete layer and to the corrugated steel layer.

It should be understood, of course, that the foregoing relates to exemplary embodiments of the invention and that modifications may be made without departing from the spirit and scope of the invention.

I claim:

1. A process of manufacturing a layered panel, the panel including: a first layer having a first surface disposed at a front side of the panel and a second opposing surface being disposed on an inside of the panel, said first layer also comprising a top surface; a second layer having a first surface in contact with the second surface of the first layer and a second opposing surface being disposed on the inside of the panel, said second layer also comprising a top surface; a third layer having a first surface disposed at a rear side of the panel, a second opposing surface being disposed on the inside of the panel, said second surface of the third layer being in contact with the second opposing surface of the second layer, said third layer also comprising a top surface; and a plate overlaying the top surface of the first layer, the top surface of the second layer and the top surface of the third layer, said plate comprising a top surface and a bottom surface, wherein the plate comprises a lip member, the lip member being substantially perpendicular to the plate, said lip member overlaying a portion of the first surface of the third layer; and a plurality of U-shaped loops, each said loop being embedded only inside the first layer, and said each loop containing two peaks attached to the bottom surface of the plate, said process comprising:

providing an open-top container having a bottom and side walls;

providing a plate assembly comprising the plate overlaying the top surface of the first layer, the lip member substantially perpendicular to the plate being attached to the plate and the U-shaped loops, said each loop having two peaks attached to the bottom surface of the plate;

placing the plate assembly inside the container such that the plate is disposed against a respective said side wall of the container, and the lip and the U-shaped loops are substantially parallel with the bottom of the container;

placing the third layer in suspension in such a manner that the first surface of the third layer is in contact with a bottom surface of the lip member;

placing the first layer inside the container in such a manner that the first surface of the first layer is disposed onto the bottom of the container and the second opposing surface of the first layer is disposed above said first surface; and placing the second layer between the first layer and the third layer in a manner such that the first surface of the second layer is disposed onto the second surface of the first layer and the second surface of the second layer is in contact with the second surface of the third layer.

2. The process of claim 1, wherein placing the first layer inside the container is accomplished by pouring concrete into the container and curing the concrete, said concrete embedding the loops inside the concrete.

3. The process of claim 1, wherein the third layer is made of corrugated steel material.

4. The process of claim 1, wherein the second layer is made by mixing a diisocyanate with a polyol at about 80° F., said mixing causing a reaction to occur that produces polyurethane, said reaction is carried out in a confined space to contain excessive pressure release produced during the reaction.

5. The process of claim 1, further comprising attaching the lip member onto the third layer by screws.

6. The process of claim 1, wherein the second layer comprises an insulating material.

7. The process of claim 6, wherein the insulating material is polyurethane.

* * * * *